United States Patent
Schubert et al.

(10) Patent No.: US 9,839,202 B2
(45) Date of Patent: Dec. 12, 2017

(54) AGRICULTURAL BROODER

(71) Applicant: Roxell USA, Inc., Milford, IN (US)

(72) Inventors: Henry Schubert, Neosho, MO (US); Michael Osterman, Rogers, AR (US); Rob Hopper, Goodman, MO (US)

(73) Assignee: Roxell USA, Inc., Milford, IN (US)

(*) Notice: Subject to any disclaimer, the term of this patent is extended or adjusted under 35 U.S.C. 154(b) by 333 days.

(21) Appl. No.: 14/293,584

(22) Filed: Jun. 2, 2014

(65) Prior Publication Data
US 2014/0352624 A1     Dec. 4, 2014

Related U.S. Application Data

(60) Provisional application No. 61/830,359, filed on Jun. 3, 2013.

(51) Int. Cl.
*A01K 31/19*     (2006.01)

(52) U.S. Cl.
CPC ............. *A01K 31/19* (2013.01); *Y10T 29/49* (2015.01); *Y10T 29/49826* (2015.01)

(58) Field of Classification Search
CPC ............................. A01K 31/19; A01K 31/20
USPC ..... 119/302, 308; 126/59.5, 109, 9 R, 65, 66
See application file for complete search history.

(56) References Cited

U.S. PATENT DOCUMENTS

| | | | | |
|---|---|---|---|---|
| 922,478 A | * | 5/1909 | Henry | A01G 13/06 |
| | | | | 126/59.5 |
| 1,410,532 A | * | 3/1922 | Molby | A01K 31/19 |
| | | | | 119/307 |
| 1,554,130 A | * | 9/1925 | Sargeant | A01K 31/20 |
| | | | | 431/310 |
| 1,801,957 A | * | 4/1931 | Grotenhuis | A01K 31/20 |
| | | | | 119/305 |
| 2,842,116 A | * | 7/1958 | Hinderer | A47J 37/0763 |
| | | | | 126/25 R |
| 2,923,274 A | * | 2/1960 | Landgraf | A01K 31/19 |
| | | | | 119/307 |
| 3,027,888 A | * | 4/1962 | Du Fault | A01K 31/19 |
| | | | | 119/305 |
| 3,123,062 A | * | 3/1964 | Psarris | A47J 37/079 |
| | | | | 126/25 B |
| 3,429,306 A | | 2/1969 | Thompson | |
| 3,503,379 A | * | 3/1970 | Kuhn | A01K 31/20 |
| | | | | 126/85 R |

(Continued)

OTHER PUBLICATIONS

International Search Report which issued in corresponding PCT patent application, 2 pages.

(Continued)

*Primary Examiner* — Son T Nguyen
(74) *Attorney, Agent, or Firm* — Clark Hill PLC

(57) ABSTRACT

The invention provides for a brooder having a cylindrical emitter and a burner head. The cylindrical emitter is formed from a flat piece of stainless steel which is manipulated in order to secure one end thereof to another end thereof, thereby allowing for reduced costs in packaging and shipping of the brooder and for easy assembly of the emitter after shipping. The burner head is formed of top and bottom plates which are secured together by port spacers of the bottom plate having tabs which extend through apertures of the top plate, and which are folded downwardly toward the top plate.

6 Claims, 15 Drawing Sheets

(56) References Cited

U.S. PATENT DOCUMENTS

| | | | | |
|---|---|---|---|---|
| 3,691,996 | A * | 9/1972 | Bowell | A01K 31/20 |
| | | | | 119/307 |
| 3,903,866 | A * | 9/1975 | Polinski | A47J 37/079 |
| | | | | 126/25 B |
| 4,614,166 | A | 9/1986 | Maurice | |
| 5,950,615 | A * | 9/1999 | Anderson | A01K 31/19 |
| | | | | 119/305 |
| 5,964,214 | A | 10/1999 | Ferlin et al. | |
| 7,967,003 | B2 * | 6/2011 | Lindsly | A47J 33/00 |
| | | | | 126/25 R |
| 8,028,689 | B2 * | 10/2011 | Bruno | A47J 37/079 |
| | | | | 126/25 B |
| 2001/0037804 | A1 | 11/2001 | Waters et al. | |
| 2004/0154551 | A1 * | 8/2004 | Brice | A01K 31/19 |
| | | | | 119/320 |
| 2005/0274372 | A1 * | 12/2005 | Knight | F24B 1/202 |
| | | | | 126/9 R |
| 2008/0272109 | A1 | 11/2008 | Bland et al. | |
| 2011/0041828 | A1 * | 2/2011 | Litzenberger | F23J 11/08 |
| | | | | 126/29 |

OTHER PUBLICATIONS

Written Opinion of the international Searching Authority which issued in corresponding PCT patent application, 7 pages.

* cited by examiner

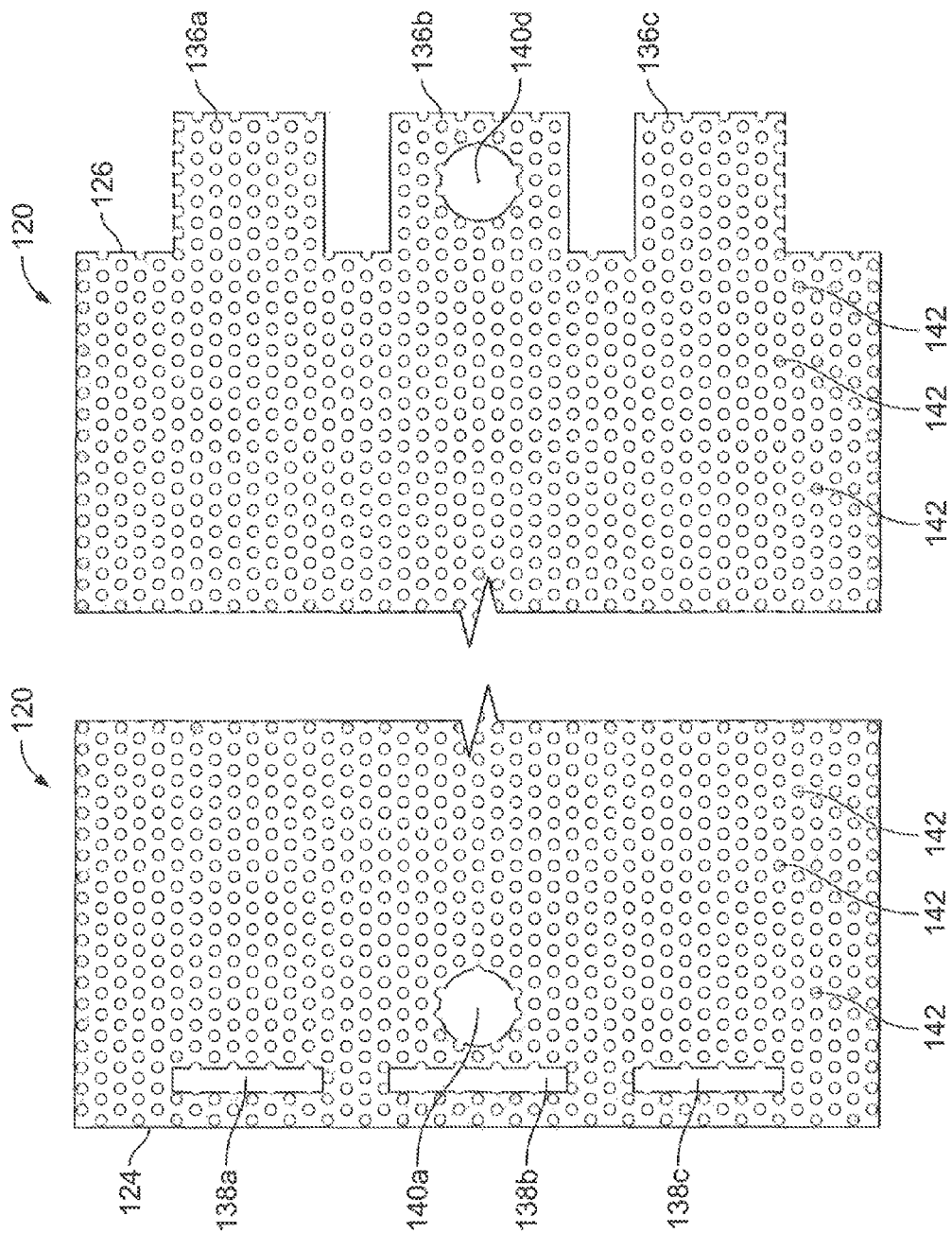

AGRICULTURAL BROODER

CROSS-REFERENCE AND INCORPORATION BY REFERENCE

This patent application claims the benefit of domestic priority of U.S. Provisional Patent Application Ser. No. 61/830,359, filed Jun. 3, 2013, and entitled "Agricultural Brooder". U.S. Provisional Patent Application Ser. No. 61/830,359 is hereby incorporated by reference in its entirety.

FIELD OF THE INVENTION

The invention relates to agricultural brooders. More particularly, the invention relates to brooders having emitters and burner heads.

BACKGROUND OF THE INVENTION

Brooders are used in agricultural locations, including poultry houses, in order to provide heat to the animals provided in the agricultural locations. Most brooders are large and are shipped to the agricultural locations, where they then need to be assembled prior to operation. In view of this, manufacturers of brooders are always searching for ways in which they can reduce their shipping costs of brooders, without affecting the operation of the brooder itself, and without affecting the time to assemble the brooders. One typical area of a brooder that causes shipping containers to be large (thus resulting in higher shipping costs) is the emitter. The emitter is typically a thin and delicate piece of stainless steel that is pre-welded into a conical configuration. As such, because the emitter is prewelded into a conical configuration, and because the emitter is a delicate and important piece of the brooder, shipping containers for the brooders tend to be large in order to provide enough space for the preassembled emitter to be properly positioned and protected within the shipping container. As such, it would be desirable to provide an improvement in the design of the emitter which would allow for more economical packaging/shipping of same along with the remainder of the brooder. Furthermore, it would also be desirable to provide an improvement in the design of the emitter which results in ease of assembly in the field.

Brooders also have burner assemblies having burner heads that are formed from two plates that are either bolted or welded together. The formation of these plates is typically performed by an expensive process, and the use of tools is required to secure the two plates together, which further adds to the time and expense associated with the formation of the burner heads. Furthermore, the plates that are bolted together are formed of cast iron and have very small individualized, and separated burner ports formed therebetween. If these burner ports are not thoroughly cleaned, the cast iron plates would begin to corrode and affect the operation of the brooder. Due to the configuration of the small individualized, and separated burner ports, the burner ports and the plates were hard to clean and sometimes the two plates would have to be unbolted from one another in order for proper cleaning to occur. The plates that are welded together can also cause their own problems as the plates could not be easily separated for cleaning, and as the burner head would tend to warp if there were not enough welds holding the plates together. The warping would cause uneven burning and, thus, would affect the operation of the brooder.

Thus, there is a need for a brooder which overcomes the disadvantages of the prior art. The present invention provides for such a brooder.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 15 is a side view of an enlarged first end portion of the piece of material used to form the emitter of the preferred embodiment of the brooder;

FIG. 16 is a side view of an enlarged second end portion of the piece of material used to form the emitter of the preferred embodiment of the brooder;

SUMMARY OF THE INVENTION

Figure 1:
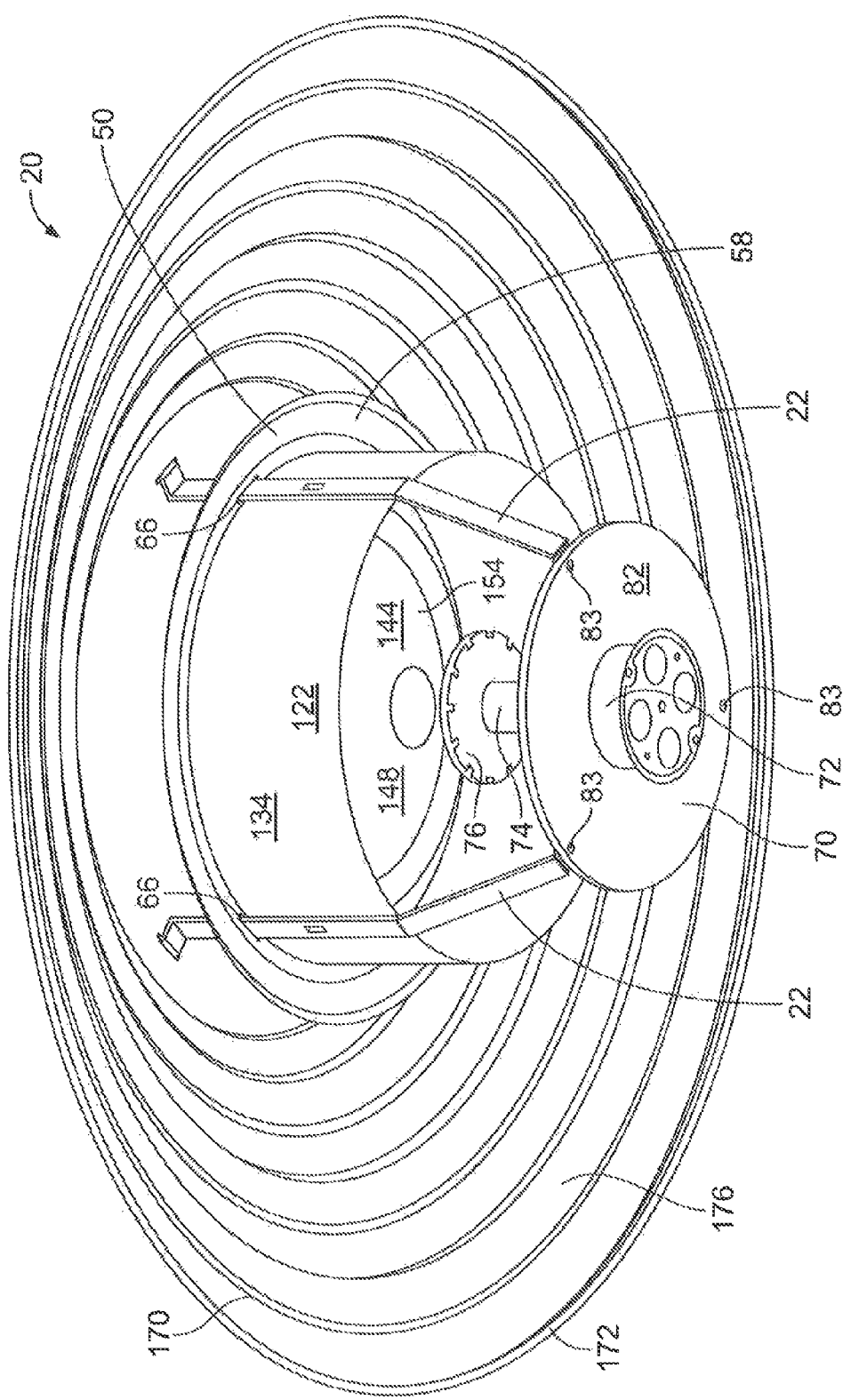
FIG. 1 is a perspective view of a brooder of a preferred embodiment of the invention.

A preferred embodiment of the invention provides a brooder which comprises a canopy, a cylindrical emitter, a burner assembly, and a framework which operatively connects the canopy, the cylindrical emitter and the burner assembly in position relative to one another.

A preferred embodiment of the invention provides a burner head of a burner assembly which comprises a top plate having at least one aperture extending therethrough, and a bottom plate having a plurality of spacers extending upwardly therefrom, wherein at least one of the plurality of spacers has a free end which abuts against the top plate in order to define an opening between the top and bottom plates, and wherein at least one of the plurality of spacers has a tab which extends therefrom and which extends through the at least one aperture of the top plate, the tab being bent down toward the top plate in order to secure the top and bottom plates together.

A preferred embodiment of the invention provides an emitter of a brooder which comprises an elongated piece of material having first and second opposite ends, wherein the elongated piece of material has a slot provided therethrough proximate to the first end thereof, wherein the elongated piece of material has a tab extending outwardly from the second end thereof, wherein the elongated piece of material has first and second apertures extending therethrough with the first aperture extending through the tab and the second aperture being provided proximate to the slot, the tab being configured to be inserted into and through the slot in a manner which causes the first and second apertures to be positioned in alignment with one another.

A preferred embodiment of the invention provides a method of forming an emitter for a brooder which comprises the steps of: a) providing an elongated piece of material having first and second opposite ends, wherein the elongated piece of material has a slot provided therethrough proximate to the first end thereof, and wherein a tab extends outwardly from the second end thereof, wherein the elongated piece of material has first and second apertures extending therethrough with the first aperture extending through the tab and the second aperture being provided proximate to the slot; and b) manipulating the elongated piece of material in order to insert the tab through the slot in order to secure the generally elongated piece of material to itself, whereby the first and second apertures are all with one another.

A preferred embodiment of the invention provides a method of forming a burner head of a burner assembly of a brooder which comprises the steps of: a) providing a top plate having an outer edge, the top plate having a plurality of apertures which extend therethrough proximate to the outer edge; b) providing a bottom plate having an outer edge, the bottom plate having a plurality of port spacers struck therefrom proximate to the outer edge, wherein a portion of the port spacers have tabs extending therefrom; c) inserting the tabs of the portion of the port spacers of the bottom plate through the apertures of the top plate until the top plate generally abuts against the port spacers which do not have the tabs extending therefrom, thereby forming burner ports between adjacent port spacers; and d) securing the top and bottom plates together by folding the tabs downwardly toward the top plate.

A preferred embodiment of the invention provides a method of forming a brooder which comprises the steps of: a) providing a reflector ring; b) providing a framework having first and second end portions; c) providing a burner assembly; d) providing a cylindrical emitter; e) providing a radiant; f) providing a canopy; g) providing a suspension system; h) securing the first end portion of the framework to the reflector ring; i) securing the second end portion of the framework to the burner assembly; j) securing the cylindrical emitter to the framework between the reflector ring and the burner assembly; k) positioning the radiant within the reflector ring; l) positioning the canopy over the radiant and the reflector ring; and m) securing the suspension system to the canopy and to the first end portion of the framework.

A preferred embodiment of the invention provides a method of packaging a brooder in an unassembled form which comprises the steps of: a) providing an appropriately-sized container to be shipped; b) inserting an unassembled emitter into the container, wherein the unassembled emitter is formed of a generally elongated, flat piece of material having first and second opposite ends, wherein the generally elongated piece of material has a slot provided therethrough proximate to the first end thereof, and wherein a tab extends outwardly from the second end thereof, wherein the generally elongated piece of material has first and second apertures extending therethrough with the first aperture extending through the tab and the second aperture being provided proximate to the slot; c) inserting other parts of the brooder into the container; and d) closing the container.

DETAILED DESCRIPTION OF THE ILLUSTRATED EMBODIMENTS

The following detailed description illustrates the invention by way of example and not by way of claimed limitation. This description will clearly enable one skilled in the art to make and use the claimed invention, and describes several embodiments, adaptations, variations, alternatives and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

FIGS. 1-4 illustrate a brooder 20 of the present invention. The brooder 20 is preferably used in agricultural settings, such as in poultry houses, but can be used in other settings as appropriate.

Figure 5:
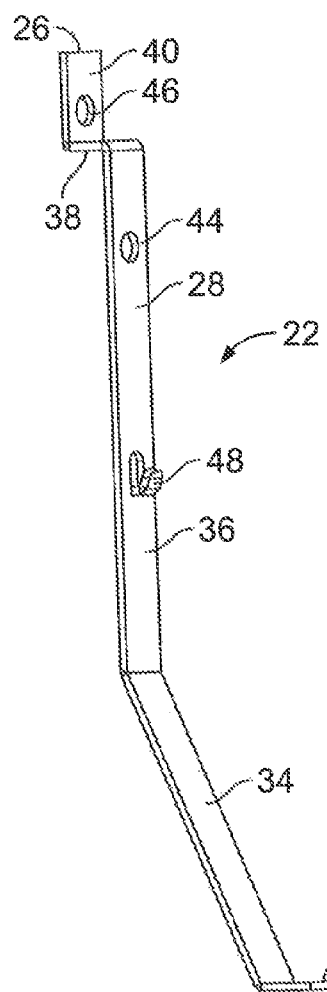
FIG. 5 is a perspective view of a leg of the preferred embodiment of the brooder.

The brooder 20 preferably includes a plurality of legs 22, collectively referred to as the framework of the brooder 20. Each of the legs 22 are preferably formed of galvanized steel. More specifically, the brooder 20 preferably includes three legs 22. As best illustrated in FIG. 5, each leg 22 has lower and upper ends 24, 26 and inner and outer surfaces 28, 30. Each leg 22 is preferably rectangular in cross-section. A first portion 32 of leg 22 extends horizontally outwardly from the lower end 24 to a second portion 34 of leg 22. The second portion 34 of leg 22 extends angularly upwardly and outwardly from the first portion 32 of leg 22 to the third portion 36 of leg 22. The third portion 36 of leg 22 extends vertically upwardly from the second portion 34 of leg 22 to the fourth portion 38 of leg 22. The fourth portion 38 of leg 22 extends horizontally outwardly from the third portion 36 of leg 22 to the fifth portion 40 of leg 22. The fifth portion 40 of leg 22 extends vertically upwardly from the fourth portion 38 of leg 22 to the upper end 26. The leg 22 is preferably integrally formed such that all of the portions 32, 34, 36, 38, 40 are formed from a single piece of material, although it is to be understood that one or more of the portions 32, 34, 36, 38, 40 could be separately formed and secured together in an appropriate manner.

The first portion 32 of leg 22 has an aperture 42 which extends therethrough. The aperture 42 is provided generally equidistantly between the lower end 24 and the connection of the first and second portions 32, 34 of leg 22. The third portion 36 of leg 22 has an aperture 44 which extends therethrough. The aperture 44 is provided proximate to the connection of the third and fourth portions 36, 38 of leg 22. The fifth portion 40 of leg 22 has an aperture 46 which extends therethrough. The aperture 46 is provided proximate to the connection of the fourth and fifth portions 38, 40 of leg 22.

The third portion 36 of leg 22 has a tab 48 formed therefrom. The tab 48 is formed by punching through the third portion 36 of leg 22 from the outer surface 30, such that the tab 48 extends inwardly from the inner surface 28 of the third portion 36 of leg 22. The tab 48 is positioned between the aperture 44 and the connection of the second and third portions 34, 36 of leg 22.

Figure 6:
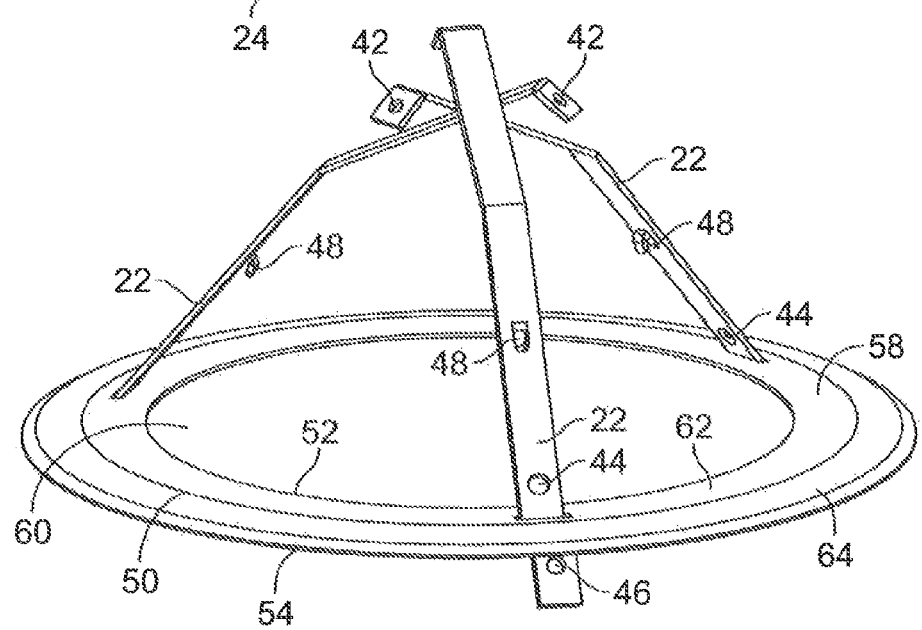
FIG. 6 is a perspective view of legs being connected to a reflector ring of the preferred embodiment of the brooder.

The brooder 20 preferably includes a reflector ring 50, as best illustrated in FIG. 6. The reflector ring 50 is preferably formed of aluminized steel. The reflector ring 50 has inner and outer edges 52, 54 and upper and lower surfaces 56, 58. The inner edge 52 of the reflector ring 50 generally defines an aperture 60 provided through the reflector ring 50. The reflector ring 50 generally defines an inner portion 62 and an outer portion 64. The inner portion 62 extends radially outwardly from the inner edge 52 to the outer portion 64 and the outer portion 64 extends radially outwardly from the inner portion 62 to the outer edge 54.

The inner portion 62 has a plurality of slots 66 formed therethrough which are configured in size in order to allow for one or more of the portions 32, 34, 36, 38, 40 of the leg 22 to move therethrough. The number of slots 66 provided in the inner portion 62 depends on the number of legs 22 provided and, therefore, the inner portion 62 preferably has three slots 66 formed therethrough. The slots 66 are preferably equidistantly spaced apart from one another.

The brooder 20 preferably includes a burner assembly 68, as best illustrated in FIGS. 7-13. The burner assembly 68 preferably includes a burner plate 70 (preferably formed of aluminized steel), a cup-like primary air inlet 72 (preferably formed of galvanized steel), a Venturi tube 74 (preferably formed of aluminized steel), and a burner head 76 (preferably formed of stainless steel). The burner plate 70 is preferably circular in configuration and has inner edge defining a center aperture (neither of which are shown), an outer edge 78, and upper and lower surfaces 80, 82. The burner plate 70 has a plurality of apertures 83 formed therethrough proximate to the outer edge 78. The number of apertures provided through the burner plate 70 proximate to the outer edge 78 depends on the number of legs 22 provided and, therefore, the burner plate 70 preferably has three apertures 79 formed therethrough proximate to the outer edge 78.

The cup-like primary air inlet 72 is operatively associated with the Venturi tube 74 in a known manner in order to provide primary air to the burner head 76 and, therefore, no details of their constructions will be discussed. The cup-like primary air inlet 72 is positioned to sit against the lower surface 82 of the burner plate 70 such that the Venturi tube 74 extends through the center aperture of the plate 70. The cup-like primary air inlet 72 and Venturi tube 74 are secured to the plate 70 in a known manner, typically by welding.

Figure 9:
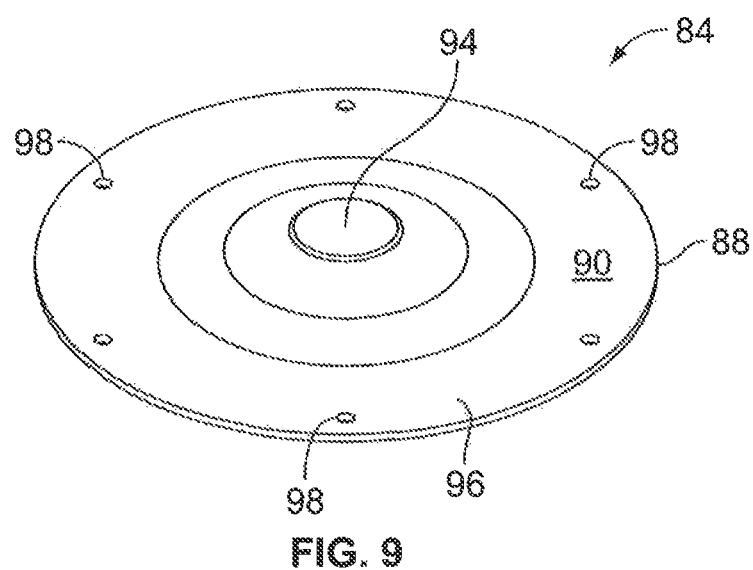
FIG. 9 is a perspective view of a top plate of a burner head of the burner assembly of the preferred embodiment of the brooder.

The burner head 76 is comprised of a top plate 84 and a bottom plate 86. As best illustrated in FIG. 9, the top plate 84 is preferably generally circular in configuration such that it has an outer edge 88 and upper and lower surfaces 90, 92.

The top plate 84 has an inner portion 94 and an outer portion 96. The outer portion 96 is provided between the inner portion 94 and the outer edge 88. The outer portion 96 is preferably horizontal and the inner portion 94 is preferably domed in an upward manner relative to the outer portion 96. The outer portion 96 preferably has a plurality of apertures 98 provided therethrough proximate to the outer edge 88. In a preferred embodiment, the outer portion 96 has six apertures 98 provided therethrough proximate to the outer edge 88, with the six apertures 98 preferably being equidistantly spaced apart from one another.

Figure 10:
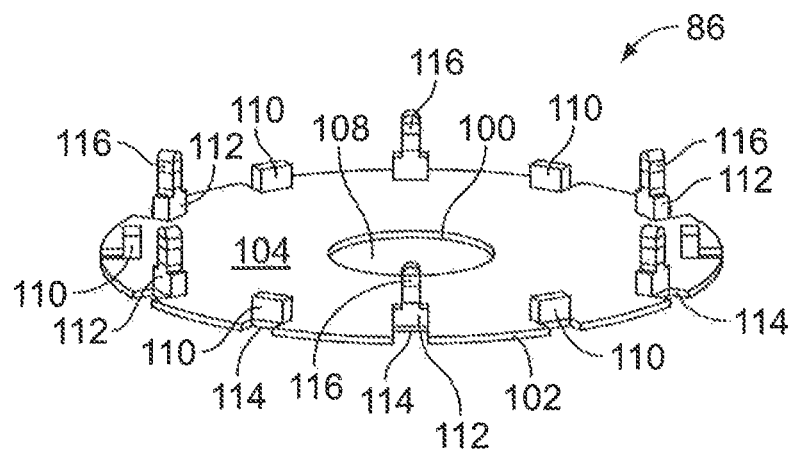
FIG. 10 is a perspective view of a bottom plate of the burner head of the burner assembly of the preferred embodiment of the brooder.

As best illustrated in FIG. 10, the bottom plate 86 is preferably generally circular in configuration and has inner and outer edges 100, 102 and upper and lower surfaces 104, 106. The inner edge 100 generally defines an aperture 108 therethrough which is configured to receive and connect to the Venturi tube 74 in a known manner, typically by welding. The bottom plate 86 has a plurality of port spacers 110, 112 extending generally vertically upwardly from the upper surface 104 thereof proximate to the outer edge 102 thereof. The port spacers 110, 112 are formed from the material forming the bottom plate 86 by punching out the bottom plate 86 from the lower surface 106 thereof along the outer edge 102. Thus, a plurality of gaps 114 are provided between the port spacers 110, 112 and the outer edge 102 of the bottom plate 86.

The bottom plate 86 is preferably provided with six port spacers 110 and six port spacers 112. The number of port spacers 112 provided determines the number of apertures 98 which are provided through the outer portion 96 of the top plate 84. The port spacers 110 are preferably equidistantly spaced apart from one another and the port spacers 112 are preferably equidistantly spaced apart from one another. A port spacer 112 is preferably provided equidistantly between adjacent port spacers 110, and a port spacer 110 is preferably provided equidistantly between adjacent port spacers 112, such that the port spacers 110 and the port spacers 112 generally alternate about the bottom plate 86.

Figure 11:
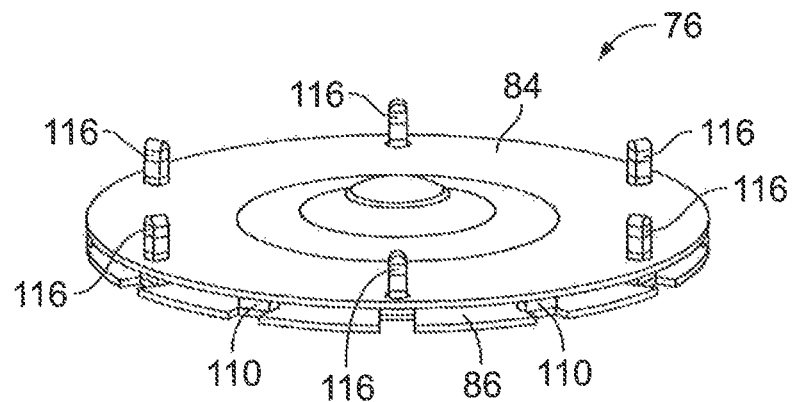
FIG. 11 is a perspective view of the formation of the burner head of the burner assembly of the preferred embodiment of the brooder.
Figure 12:
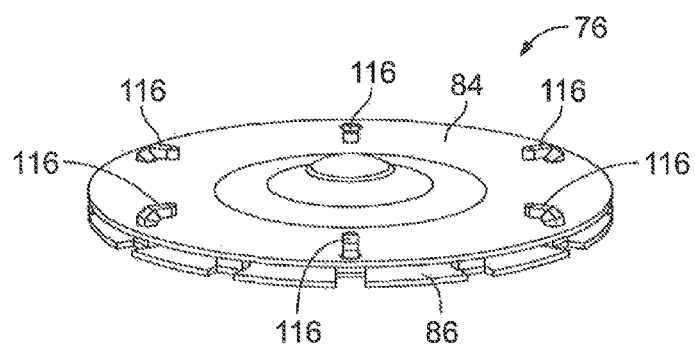
FIG. 12 is a perspective view of the burner head of the burner assembly of the preferred embodiment of the brooder.
Figure 13:
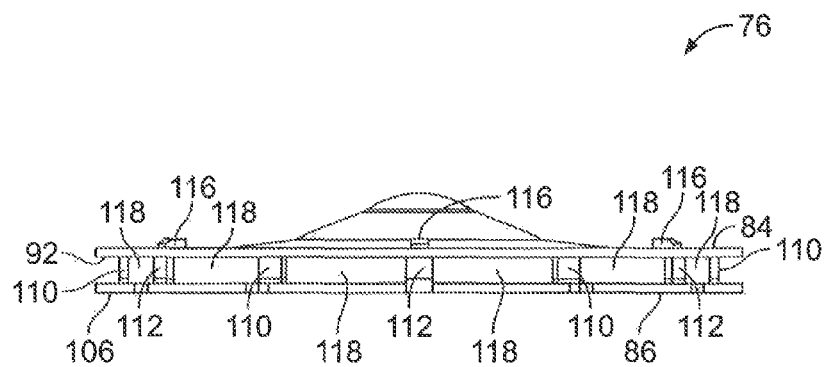
FIG. 13 is a side view of the burner head of the burner assembly of the preferred embodiment of the brooder.

The port spacers 112 differ from the port spacers 110 in that they have a tab 116 extending upwardly therefrom, thus providing stepped configuration. As best illustrated in FIG. 11, the tabs 116 are configured to extend through the apertures 98 provided through the outer portion 96 of the top plate 84, until the lower surface 92 of the top plate 84 abuts against the port spacers 110, 112 of the bottom plate 86. As best illustrated in FIGS. 12 and 13, with the tabs 116 extending through the apertures 98 of the top plate 84, the tabs 116 are then clinched/bent downwardly onto the upper surface 90 of the top plate 84 in order to secure the top and bottom plates 84, 86 together. The provision of the port spacers 110, 112 provides a plurality of burner ports 118 between adjacent port spacers 110, 112, with proper and ideal port spacing, as well as a stepped configuration which provides for the proper alignment and location of the top plate 84 to the bottom plate 86, thereby affixing the final size of the burner ports 118. The domed inner portion 94 of the top plate 84 allows for volume of primary air and fuel for final mixing.

Figure 14:
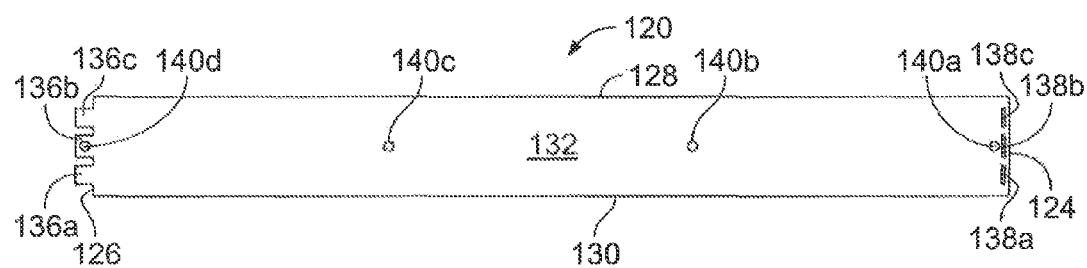
FIG. 14 is a side view of a piece of material used to form an emitter of the preferred embodiment of the brooder.

The brooder 20 preferably includes an elongated, generally rectangular-shaped piece of material 120, which is configured to form an emitter 122 of the brooder 20, as will be discussed in further detail hereinbelow. The piece of material 120 is preferably formed of stainless steel, but may be made of any other suitable material. As best illustrated in FIGS. 14-16, the piece of material 120 has first and second opposite ends 124, 126, upper and lower edges 128, 130, and inner and outer surfaces 132, 134. Three tabs 136a, 136b, 136c extend outwardly from the second end 126. The tabs 136a, 136b, 136c are separated from themselves and from the upper and lower edges 128, 130. While three tabs 136a, 136b, 136c are described and illustrated, it is to be understood that more or less tabs could be provided.

The piece of material 120 has three slots 138a, 138b, 138c provided proximate to the first end 124. The slots 138a, 138b, 138c are separated from themselves and from the upper and lower edges 128, 130. The number of slots 138 and the number of tabs 136 should preferably be identical for reasons which will become apparent hereinbelow. The piece of material 120 also has four apertures 140a, 140b, 140c, 140d which are provided therethrough. The aperture 140a is provided proximate to the middle slot 138b with the middle slot 138b being positioned between the aperture 140a and the first end 124. The aperture 140d is provided through the middle tab 136b. The remaining two apertures 140b, 140c are provided approximately one-third of the distance between the apertures 140a, 140d and two-thirds of the distance between the apertures 140a, 140d, respectively. The piece of material 120 further includes a plurality of perforations 142 provided therethrough (including preferably through the tabs 136a, 136b, 136c) in a desired pattern (it should be noted that, for clarity reasons, the perforations 142 are only illustrated in FIGS. 15 and 16).

Figure 17:
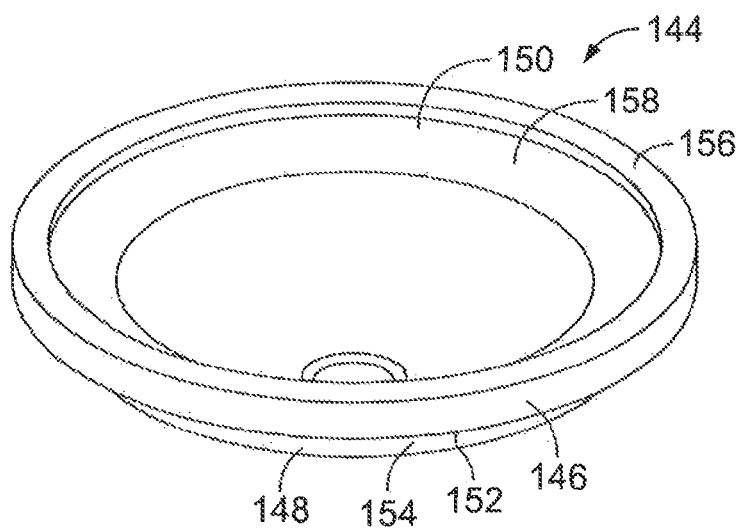
FIG. 17 is a perspective view of a radiant of the preferred embodiment of the brooder.

The brooder 20 preferably includes a radiant 144. The radiant 144 is preferably formed of KAO-Wool M 2300<MOD-DEG> Vacuum Formed Board With Silica Coating, commonly referred to as ceramic fiber. As best illustrated in FIG. 17, the radiant 144 preferably has a generally cylindrical outer wall 146, a lower surface 148 and an upper surface 150. The lower surface 148 has a generally horizontal portion 152 proximate to the outer wall 146 and a generally domed or cone-like portion 154 inward of the horizontal portion 152, such that the domed or cone-like portion 154 of the lower surface 148 extends to a position which is positioned below the horizontal portion 152 of the lower surface 148. Likewise, the upper surface 150 has a generally horizontal portion 156 proximate to the outer wall 146 and a generally domed or cone-like portion 158 inward of the horizontal portion 156, such that the domed or cone-like portion 158 of the upper surface 150 extends to a position which is positioned below the horizontal portion 156 of the upper surface 150.

The brooder 20 preferably includes a plurality of retainer clips 160. Each retainer clip 160. Each spring clip 160 has a base 162 and a pair of legs 164, 166 which extend outwardly in the same direction from opposite ends of the base 162. The legs 164, 166 are naturally biased to extend away from one another, but can be moved toward one another upon an application of force.

Figure 2:
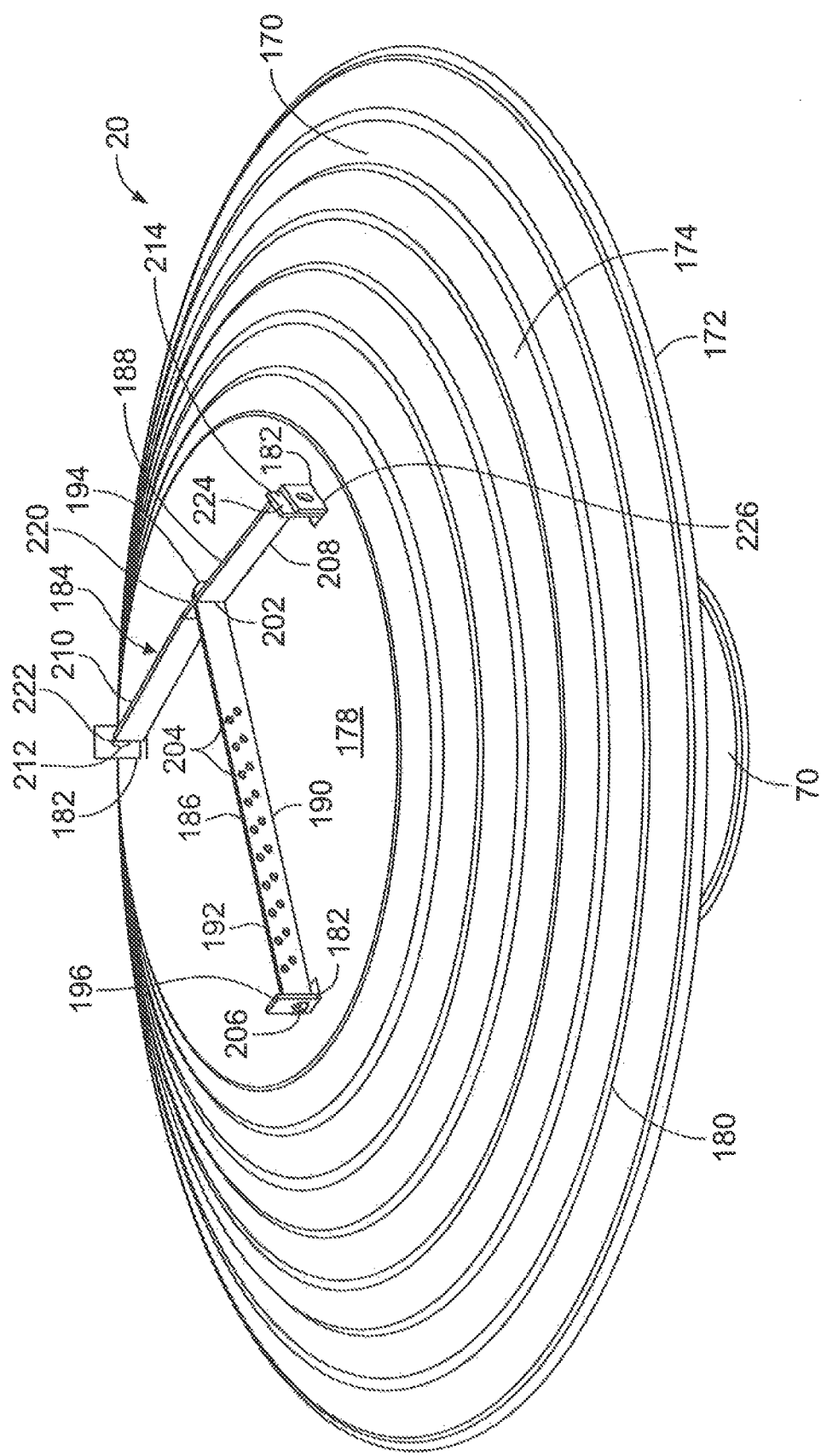
FIG. 2 is an alternative perspective view of the preferred embodiment of the brooder of the invention.
Figure 3:
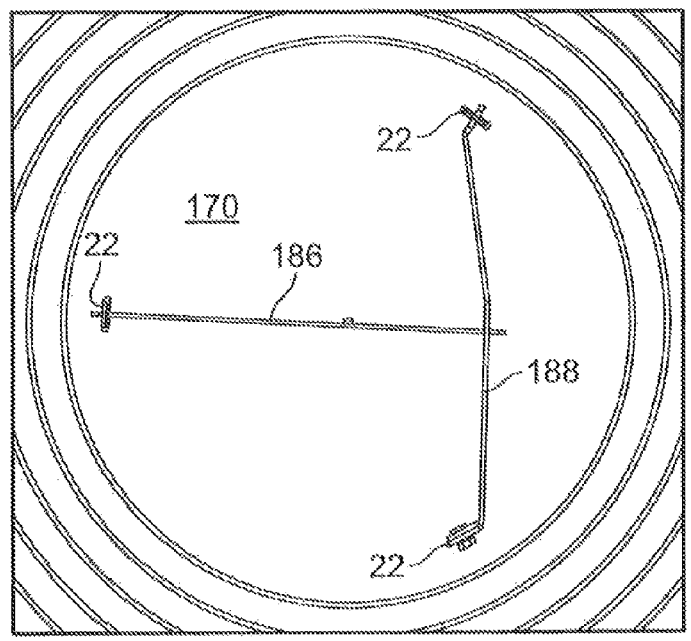
FIG. 3 is a partial top view of the preferred embodiment of the brooder of the invention, illustrating the suspension system.

The brooder 20 preferably includes a canopy 170, as best illustrated in FIGS. 1 and 2. The canopy 170 is preferably formed of aluminum or galvanized steel, but may be formed of other suitable materials as well, such as other metals or coated steels. The canopy 170 has an outer edge 172 and upper and lower surfaces 174, 176. The canopy 170 further has an inner portion 178 which is preferably horizontal and circular in configuration. The canopy further has an outer portion 180 which is generally angled and extends downwardly and outwardly from the inner portion 178 to the outer edge 172. The inner portion 178 preferably has three slots 182 provided therethrough proximate to the connection of the inner and outer portions 178, 180. The slots 182 are preferably equidistantly spaced apart from one another. As noted, the slots 182 preferably number three as the slots 182 are provided in order to be operably associated with the legs 22, as will be discussed hereinbelow. Thus, it is to be understood that the number of slots 182 provided will preferably always be equal to the number of legs 22 provided.

The brooder 20 preferably includes a suspension system 184, as best illustrated in FIG. 2. The suspension system 184 generally comprises first and second arms or hangars 186, 188, each of which are preferably formed of galvanized steel. The first arm 186 is preferably straight and rectangular in cross-section. The first arm 186 has lower and upper edges 190, 192 and first and second ends 194, 196. A notch 202 is provided proximate to the first end 194 and extends downwardly from the upper edge 192 toward the lower edge 190. A plurality of apertures 204 are provided through the first arm 186 from the first surface 198 to the second surface 200, and are provided between the notch 202 and the second end 196. An end portion 206 provided at the second end 196 of the first arm 186 is comprised of an outwardly projecting hook-like structure.

The second arm 188 is rectangular in cross-section. The second arm 188 has lower and upper edges 208, 210 and first and second ends 212, 214. A notch 220 is provided generally equidistantly between the first and second ends 212, 214 and extends upwardly from the lower edge 208 toward the upper edge 210. A first end portion 222 of the second arm 188 is comprised of an outwardly projecting hook-like structure, and a second end portion 224 of the second arm 188 is comprised of a portion of the second arm 188 which is angled relative to the remainder of the second arm 188 (although the second arm 188 may be slightly angled between the first and second ends 212, 214 at parts thereof in order for the second arm to operate in the desired manner, as discussed hereinbelow). An aperture is provided through the second end portion 224 of the second arm 188 from the first surface 216 to the second surface 218.

The suspension system 184 further comprises a nut 228 and a bolt 230.

Attention will now be directed to the assembly of the brooder 20. While the manner of assembly of the brooder 20 will be described and illustrated in a preferred manner and order, it is to be understood that the assembly of the brooder 20 can be performed in any manner or order desired, so long as the brooder 20 is properly assembled at the completion of the assembly process.

As illustrated in FIG. 6, the assembly of the brooder 20 begins with placing the reflector ring 50 on a surface, with the upper surface 56 facing downwardly. The fifth portion 40 of one of the legs 22 is then inserted through one of the slots 66 of the inner portion 62 of the reflector ring 50 from the lower surface 58 of the reflector ring 50. When the fifth portion 40 is through the slot 66, the leg 22 is angled in order to allow for the fourth portion 38 of the leg 22 to also be inserted through the slot 66. When the fourth portion 38 of the leg 22 is through the slot 66, the leg 22 is again angled such that the fourth portion 38 of the leg 22 generally abuts against the upper surface 56 of the reflector ring 50. The fifth portion 40 of the leg 22 thus extends generally perpendicularly to the upper surface 56 of the reflector ring 50 and the fifth portion 40 of the leg 22 is provided more proximate to the outer edge 54 of the reflector ring 50 than is the third portion 36 of the leg 22. This process is then repeated for the other two legs 22.

Figure 7:
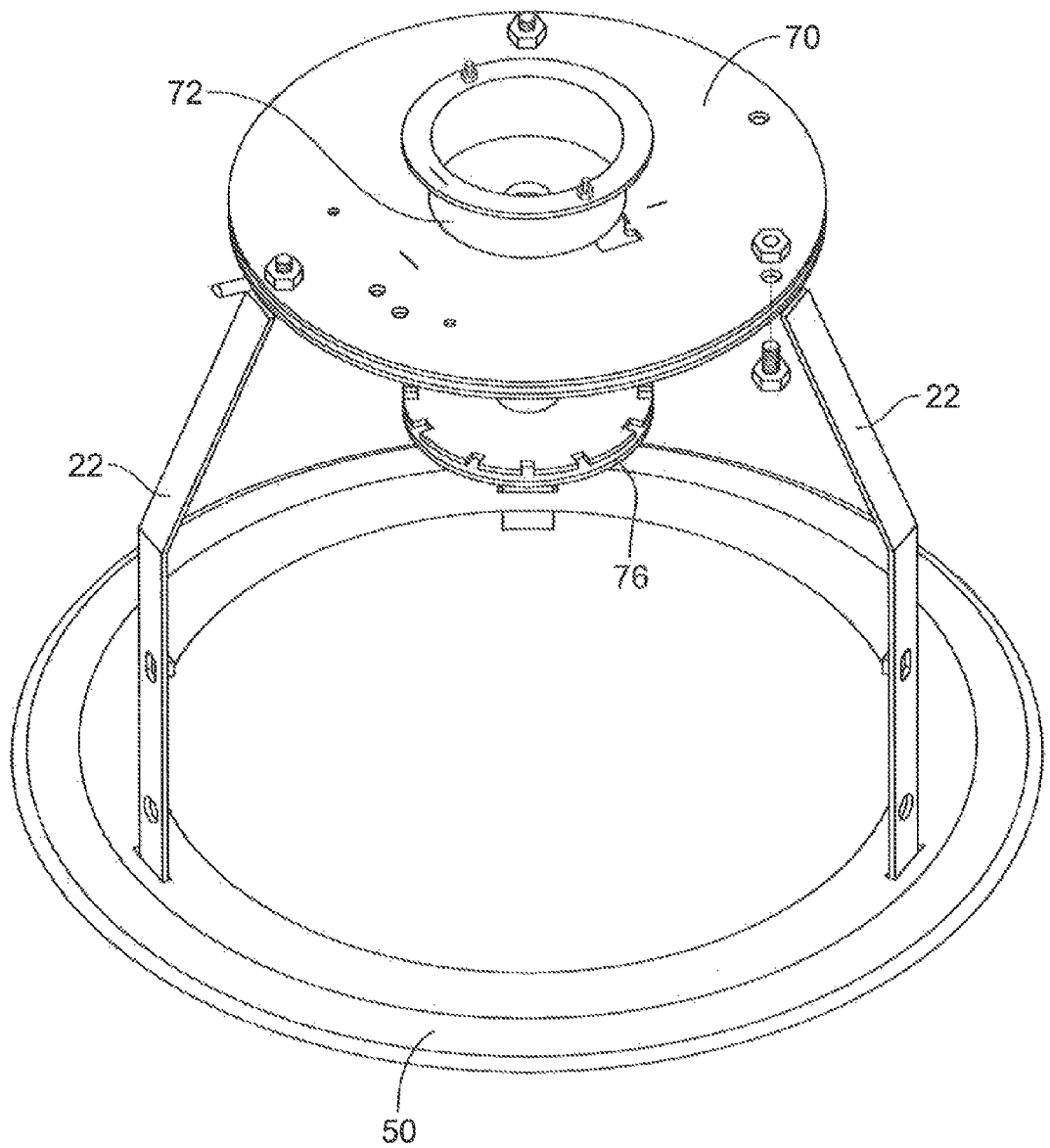
FIG. 7 is a perspective view illustrating an assembly of the legs, reflector ring, and burner assembly of the preferred embodiment of the brooder.
Figure 8:
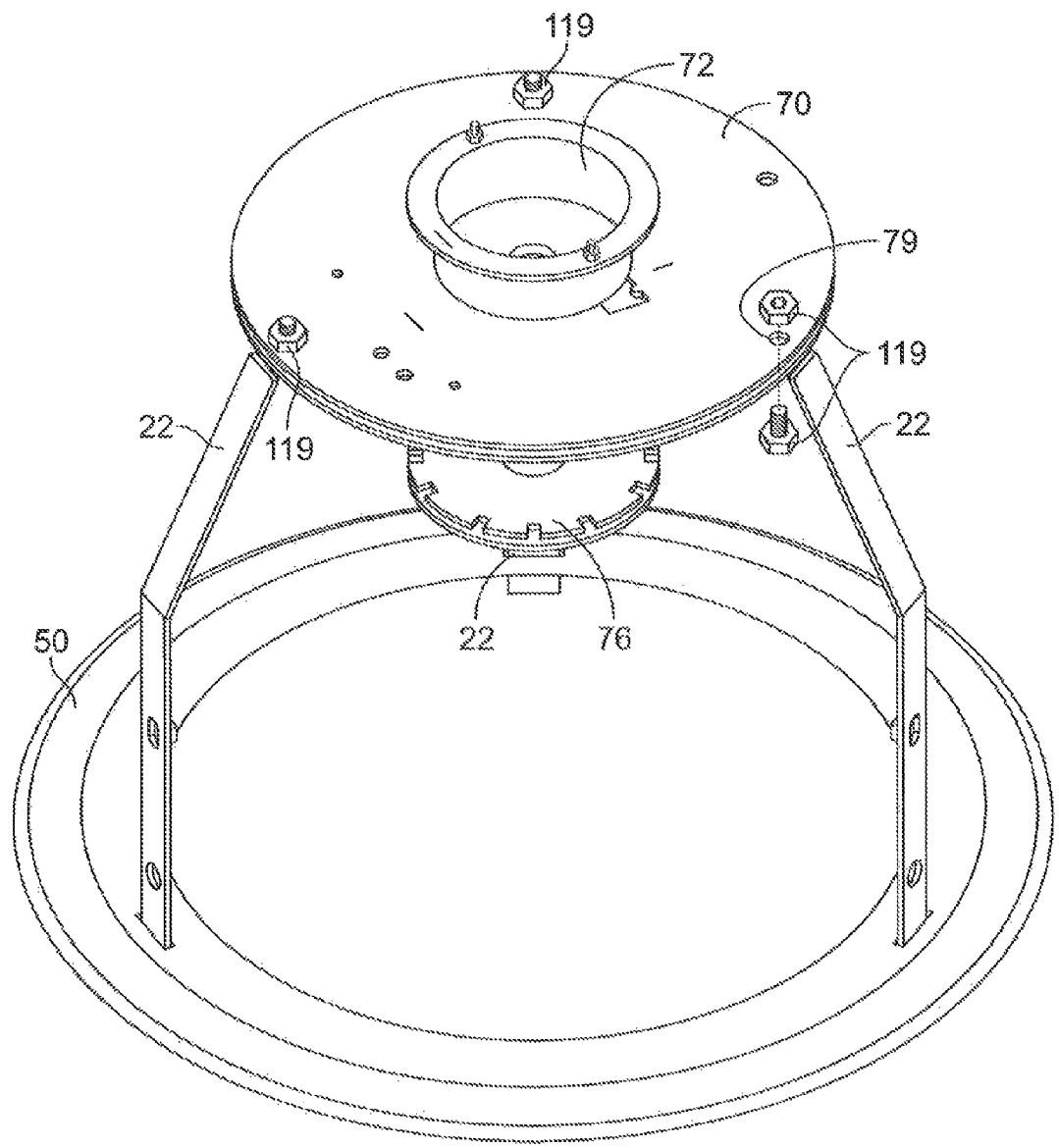
FIG. 8 is an perspective view of a portion of the assembly of FIG. 7.

As illustrated in FIGS. 7 and 8, the burner assembly 68 is positioned upside-down and the first portions 32 of the legs 22 are positioned against the upper surface 80 of the burner plate 70, with the apertures 42 of the first portions 32 of the legs 22 being in alignment with the apertures 79 of the burner plate 70. An appropriate fastener assembly 119 (such as a screw and a nut) are then inserted through the respective apertures 42, 79 in order to secure each of the legs 22 to the burner plate 70. The fastener assembly 119 is advantageously the only fastener assembly which preferably requires the use of tools during the formation of the brooder 20.

Figure 18:
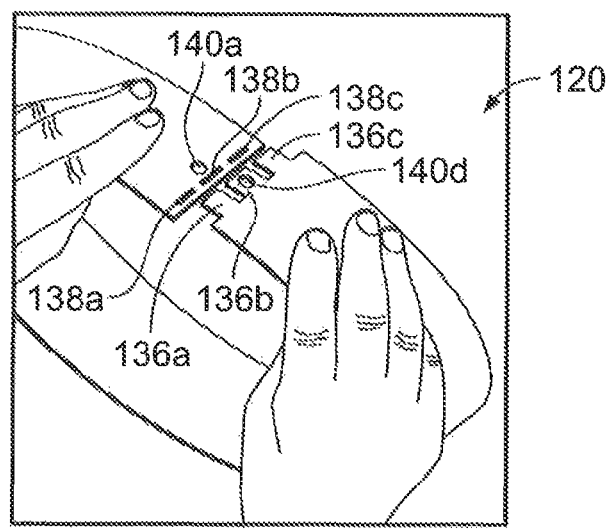
FIGS. 18 and 19 are perspective views illustrating the formation of the emitter of the preferred embodiment of the brooder.
Figure 19:
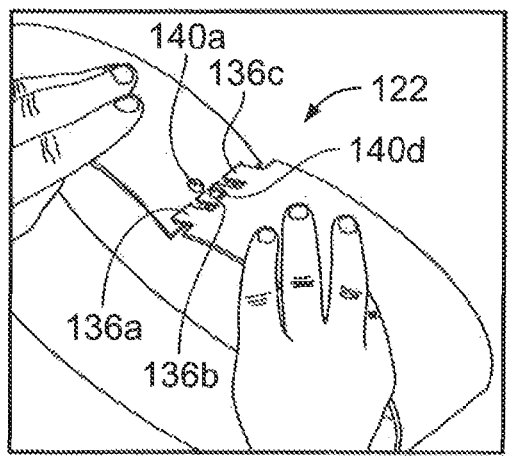
Figure 20:
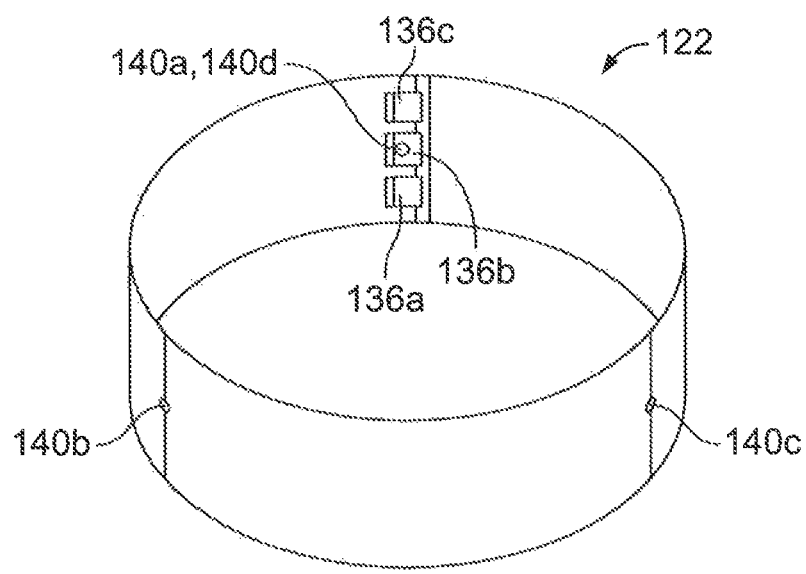
FIG. 20 is a perspective view of the emitter of the preferred embodiment of the brooder.

As illustrated in FIGS. 18-20, the piece of material 120 is manipulated in order to form the emitter 122 of the brooder 20. The piece of material 120 is manipulated in order to insert the tabs 136a, 136b, 136c into and through the slots 138a, 138b, 138c, respectively, from the outer surface 134 of the piece of material 120. With the tabs 136a, 136b, 136c inserted through the slots 138a, 138b, 138c, the outer surface 134 of the tabs 136a, 136b, 136c is positioned against the inner surface 132 of the piece of material 120 and the apertures 140a, 140d are in general alignment with one another, and the emitter 122 is formed. The emitter 122 is thus generally cylindrical in configuration due to the piece of material 120 being generally rectangular in configuration. As the emitter 122 is cylindrical in configuration, as opposed to conical, the emitter 122 has an increased surface area compared to emitters of the prior art, which increased surface area advantageously leads to more emitting surface, thereby allowing the brooder 20 to create more infrared energy.

Figure 4:
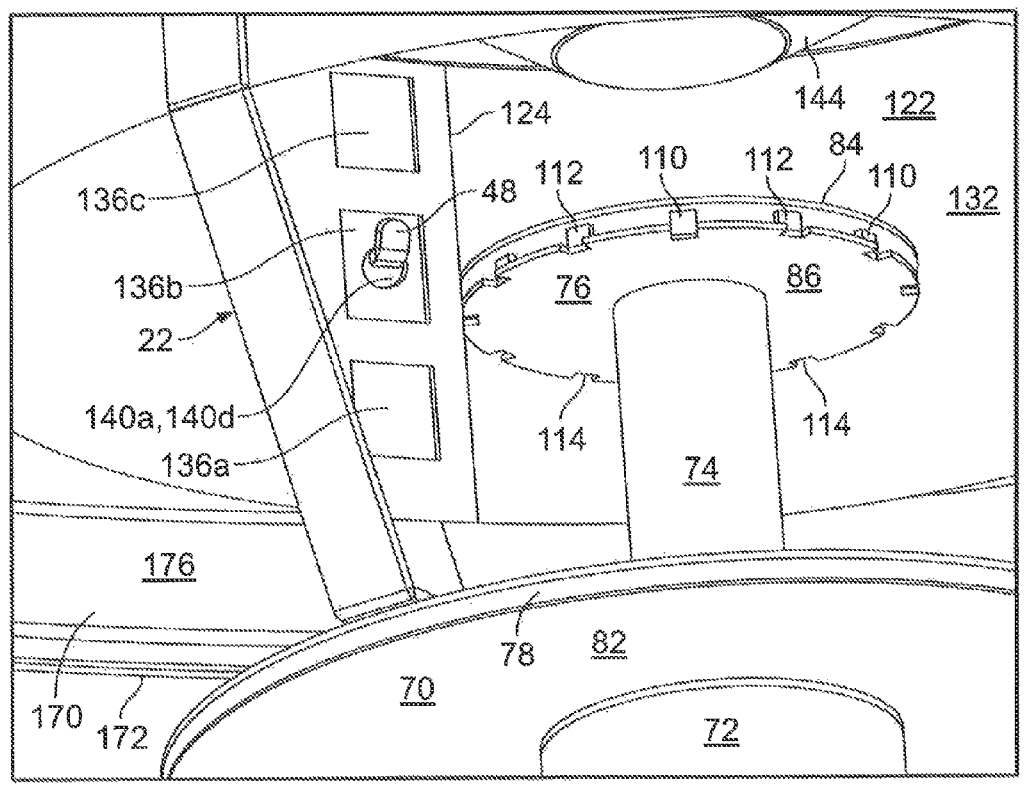
FIG. 4 is a partial perspective view of the preferred embodiment of the brooder of the invention.
Figure 21:
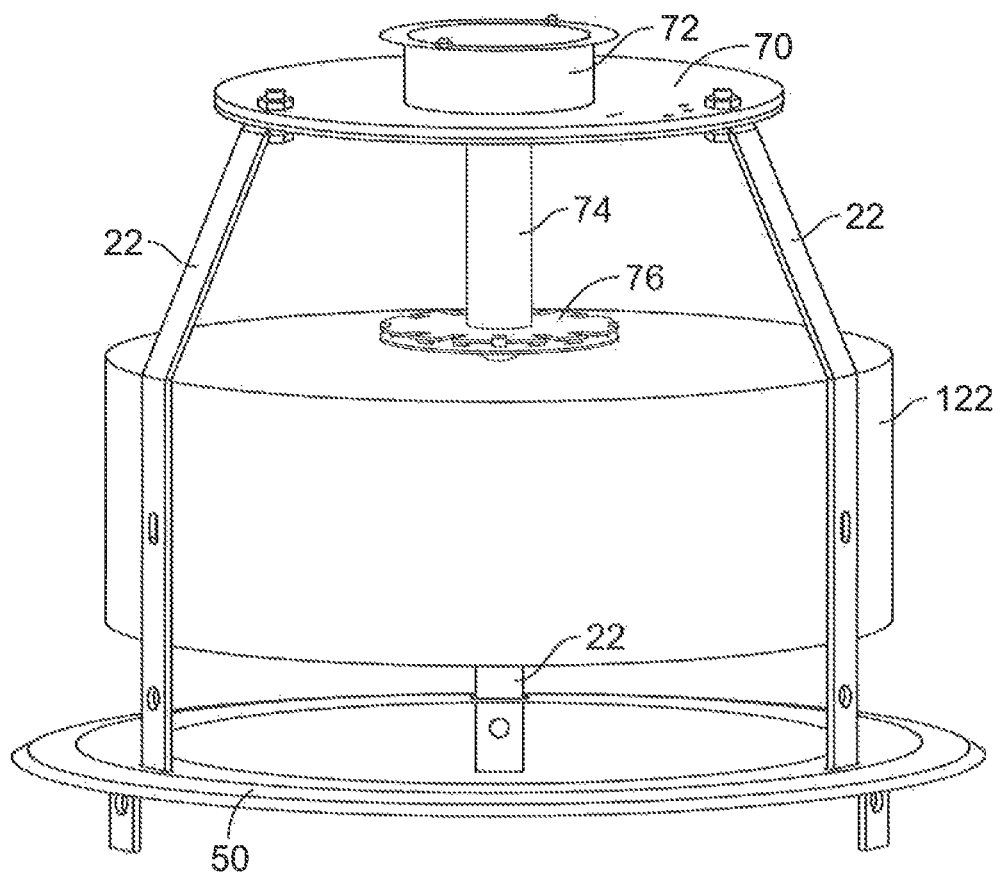
FIGS. 21-29 are views illustrating the formation of the preferred embodiment of the brooder.

With the emitter 122 formed, the emitter 122 is positioned between the three legs 22, above the reflector ring 50, and below the burner assembly 68. As best illustrated in FIGS. 1, 4 and 21, the tab 48 of each leg 22 is then positioned to extend through one of the holes 140b, 140c, 140a/140d of the emitter 122 in order to secure the emitter 122 together and in order to secure the emitter 122 in proper position between the three legs 22, above the reflector ring 50, and below the burner assembly 68. As illustrated, the upper edge 128 of the emitter 122 is preferably spaced from the reflector ring 50 and the lower edge 130 of the emitter 122 is preferably spaced from the burner head 76 of the burner assembly 68. The lower edge 130 of the emitter 122 is generally provided proximate to the connection of the second and third portions 34, 36 of each leg 22.

Figure 22:
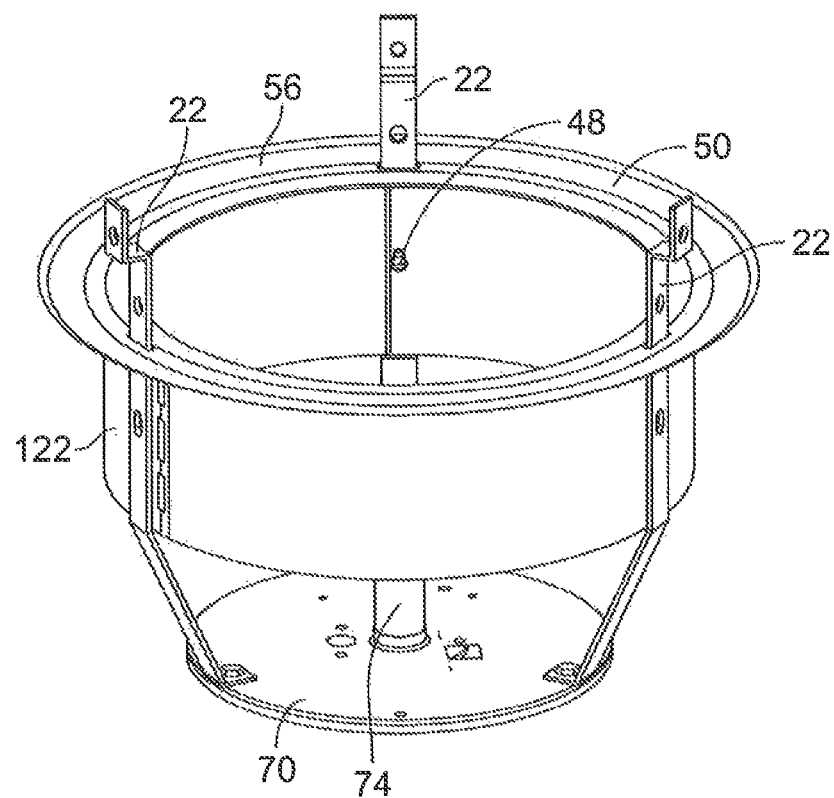

As illustrated in FIG. 22, the entire formed assembly is then turned over such that the cup-like primary air inlet 72 preferably rests on a flat surface and such that the reflector ring 50 is provided proximate the top of the entire formed assembly, with only the third (and a portion thereof), fourth and fifth portions 36, 38, 40 of each leg 22 being positioned above the reflector ring 50.

Figure 23:
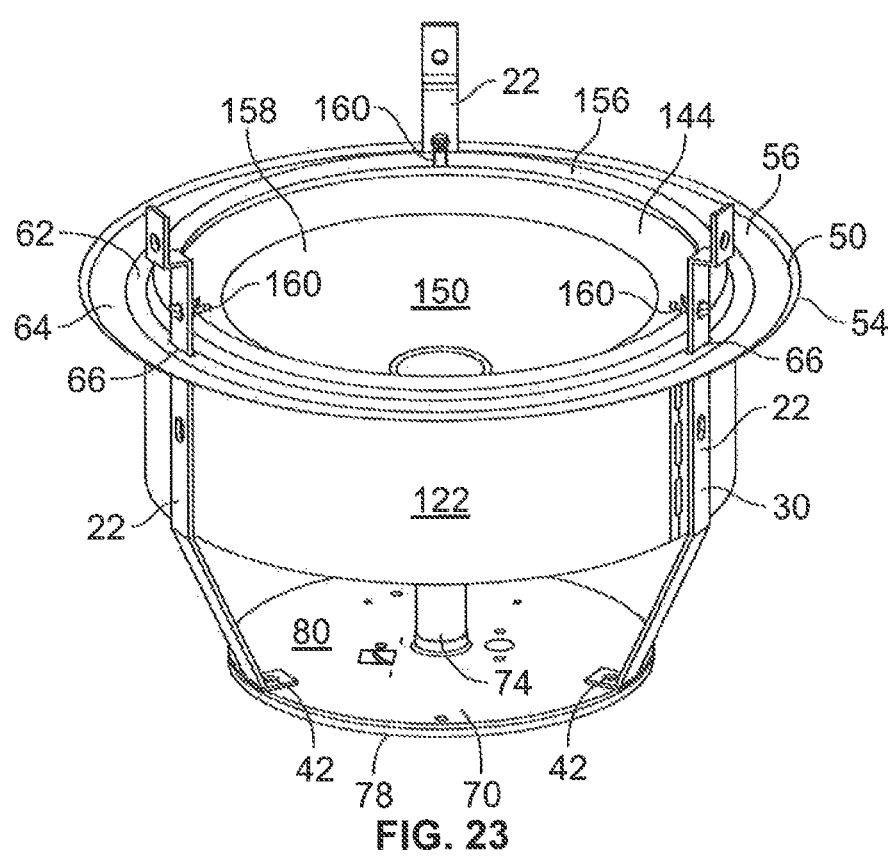
Figure 24:
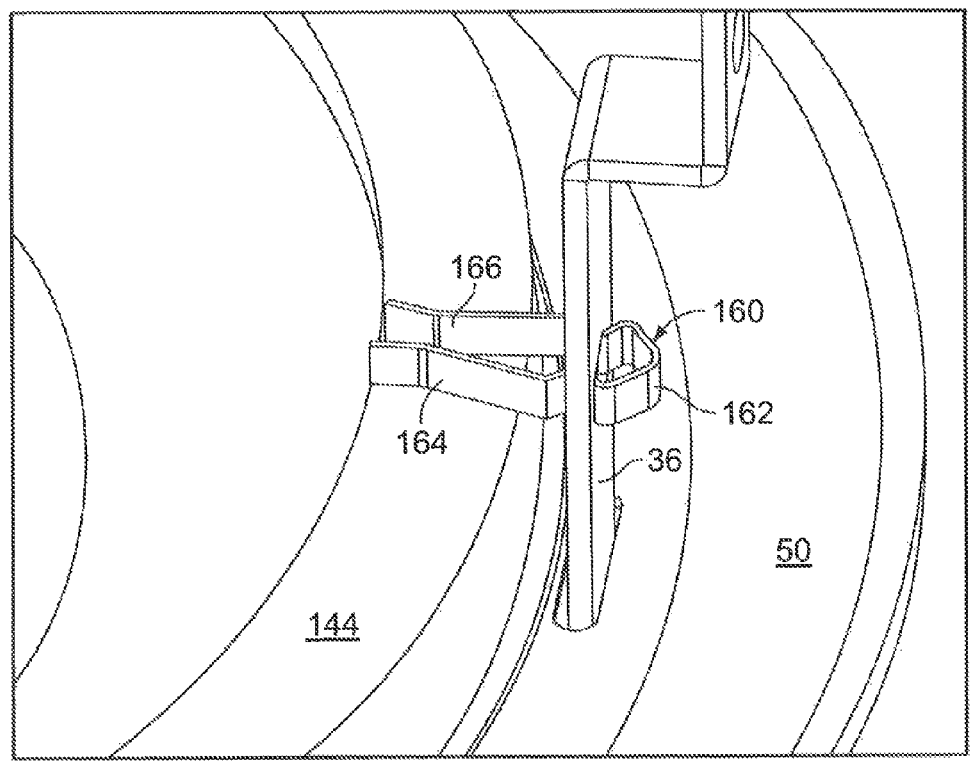

As illustrated in FIGS. 23 and 24, the radiant 144 is then positioned to extend through the aperture 60 of the reflector ring 50. More specifically, the horizontal portion 152 of the radiant 144 is positioned to rest on the upper surface 56 of the reflector ring 50, inside of where the third portions 36 of the legs 22 extend through the reflector ring 50. With the radiant 144 positioned in this manner, the domed or cone-like portion 154 of the lower surface 148 of the radiant 144 extends through the aperture 60 of the reflector ring 50, thereby placing the domed- or cone-like portion 154 of the lower surface 148 into opposition position to the domed inner portion 94 of the top plate 84 of the burner head 76.

With the radiant 144 in position, the legs 164, 166 of the retainer clips 160 are inserted through the apertures 44 of the third portions 36 of the legs 22, from the outer surface 30 thereof, such that the legs 164, 166 of the retainer clips 160 are positioned over the horizontal portion 156 of the upper surface 150 of the radiant 144. The legs 164, 166 of the retainer clips 160 then naturally bias in opposite directions in order to retain the retainer clips 160 within the apertures 44 of the third portions 36 of the legs 22, and in order to retain the radiant 144 in its desired position. The retainer clips 160 keep the emitter 122 from coming off of the tab 48 of each leg 22.

Figure 25:
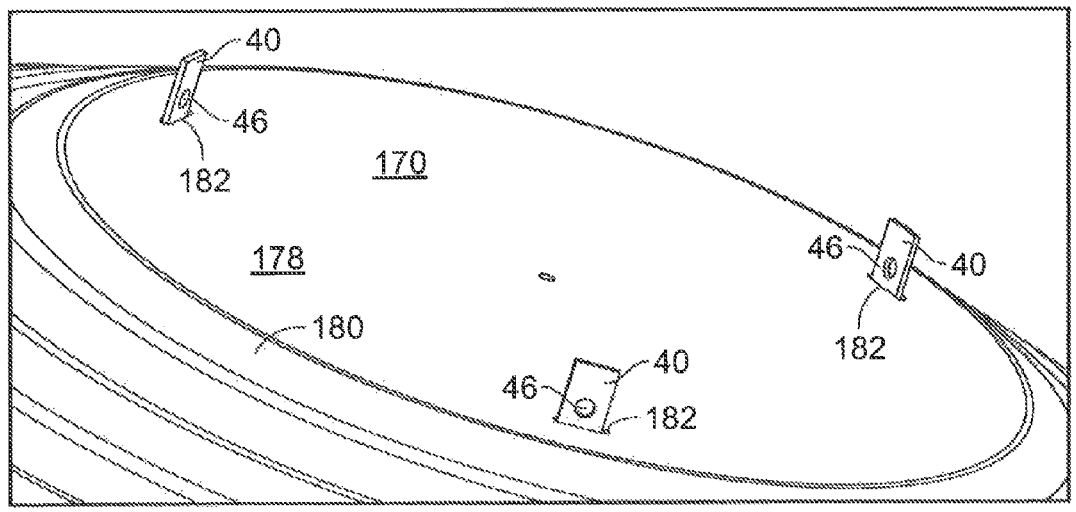

With the radiant 144 held in position by the retainer clips 160, the fifth portions 40 of the legs 22 are inserted through the slots 172 of the inner portion 178 of the canopy 170, until the fourth portions 38 of the legs 22 generally abut against the lower surface 176 of the inner portion 178 of the canopy 170, as illustrated in FIG. 25.

Figure 26:
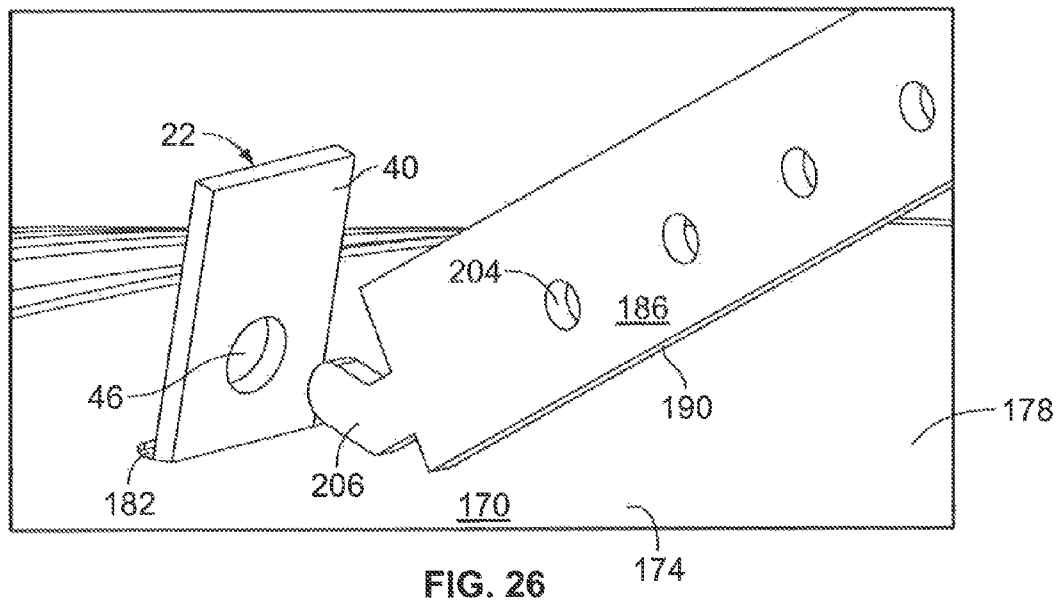

With the fifth portions 40 of the legs 22 extending through the slots 172 of the inner portion 178 of the canopy 170, the suspension system 184 is then secured to the canopy 170 and to the legs 22. As illustrated in FIG. 26, the end portion 206 of the first arm 186 is inserted through the aperture 46 of the fifth portion 40 of one of the three legs 22 in order to engage the first arm 186 with that leg 22. The lower edge 190 of the first arm 186 is positioned against the upper surface 174 of the inner portion 178 of the canopy 170.

Figure 27:
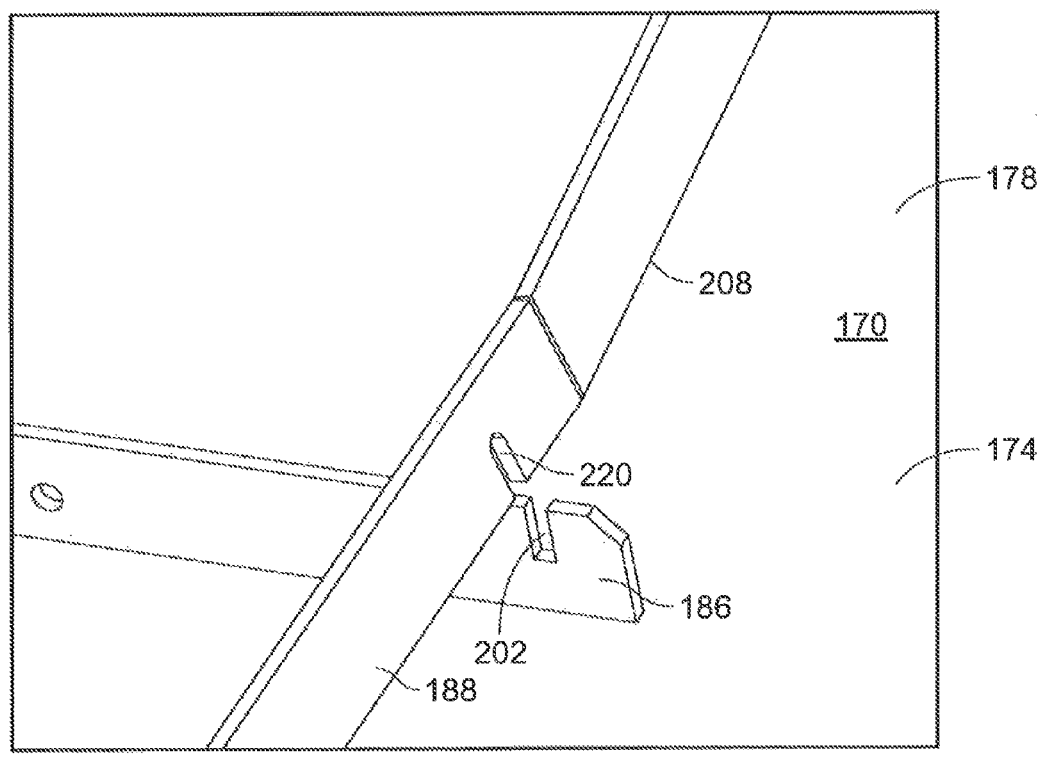
Figure 28:
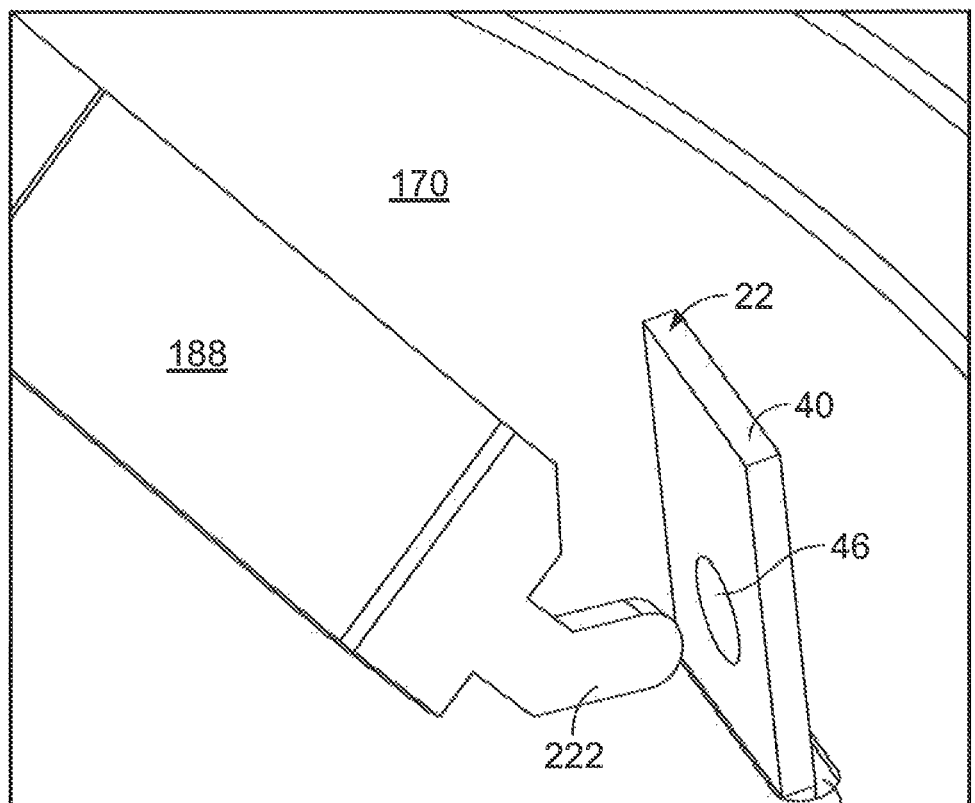
Figure 29:
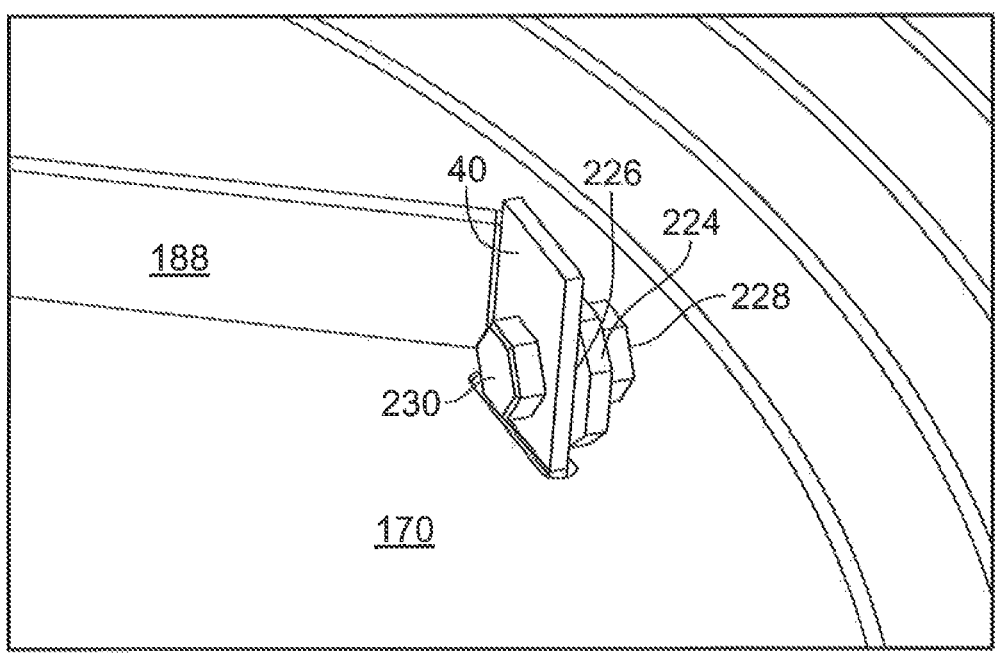

As illustrated in FIG. 27, the second arm 188 is then positioned to engage with the first arm 186 by aligning the notches 202, 220 of the first and second arms 186, 188, thereby causing the first and second arms 186, 188 to be positioned in a T-like configuration, with the lower edge 208 of the second arm 188 being positioned against the upper surface 174 of the inner portion 178 of the canopy 170. Like the end portion 206 of the first arm 186, and as illustrated in FIG. 28, the first end portion 222 of the second arm 188 is inserted through the aperture 46 of the fifth portion 40 of another one of the three legs 22 in order to engage the second arm 188 with that leg 22. As illustrated in FIG. 29, the second end portion 224 of the second arm 188 is positioned against the outer surface 30 of the fifth portion 40 of the last of the three legs 22 such that the apertures 40, 226 are in alignment with one another. The bolt 230 is then extended through the apertures 40, 226 and the nut 228 is threaded onto the free end of the boll 230 in order to secure the second arm 188 and the third leg 22 together.

The brooder 20 is thus formed and is free to be used in a known manner. The brooder 20 provides a number of advantages over brooders 20 of the prior art.

One advantage of the brooder 20 in comparison to the prior art is that the brooder 20 can be shipped in a smaller shipping carton than other brooders of its general type, thereby providing that the brooder 20 can be packaged and shipped for less than other brooders of its general type. The reason that the brooder 20 can be shipped in a smaller shipping carton is because of the formation of the emitter 122. Emitters are normally pre-assembled prior to shipping as they are typically welded in a conical configuration, thus requiring a larger shipping carton. The brooder 20 does not, however, ship with a pre-assembled conical emitter, but rather ships with the flat piece of stainless steel 120 that is later rolled together to form the emitter 122 (in cylindrical configuration). The flat piece of stainless steel 120 thus allows for the brooder 20 to be shipped in a smaller shipping carton to reduce cost per unit shipped, while not sacrificing assembly time during installation.

Outfitting the piece of stainless steel 120 that is used to form the emitter 122 with the apertures 140a, 140b, 140c, 140d provides a benefit to the emitter 122. More specifically, the tab 48 of one of the legs 22 extending through the apertures 140a, 140d keeps the emitter 122 from coming apart at its ends. The tabs 48 of the legs 22 extending through the apertures 140a/140d, 140b, 140c holds the emitter 122 in proper relation to the burner assembly 68, and allows for the emitter 122 to support the reflector ring 50 and the radiant 144. The tabs 48 of the legs 22 extending through the apertures 140*a*/140*d*, 140*b*, 140*c* further keeps the emitter 122 formed in a cylindrical shape, as desired.

A further advantage of the emitter 122 compared to emitters of the prior art is that the emitter 122 is formed in a cylindrical configuration. Thus, the cylindrical emitter 122 has an increased surface area as opposed to typical conical emitters, and the increased surface area results in more emitting surface, which allows for the brooder 20 to create more infrared energy. This increase in infrared energy, in conjunction with the configuration of the canopy 170, ensures that the amount of infrared energy that is directed downwardly to the floor is on par with the amount of infrared energy that is directed downwardly by conical-shaped emitters. So, the effectiveness of the brooder 20 is on par with prior art brooders having conical-shaped emitters, yet the configuration of the brooder 20 allows for the costs related to the formation and the shipping of the brooder 20 to be less expensive than prior art brooders having conical-shaped emitters.

The connection of the emitter 122 to the framework (the legs 22) of the brooder 20 also provides advantages. The tabs 48 of the legs 22 extending through one of the holes 140*b*, 140*c*, 140*a*/140*d* of the emitter 122 not only secures the emitter 122 in place relative to the legs 122, but also secures it is a loose manner that allows for the emitter 122 to, in essence, "float" on the legs 122. This "float" is advantageous because as the emitter 122 is heated up, it will necessarily grow/expand, thereby providing the emitter 122 with the freedom to move as it grows/expands, without comprising the structure of the brooder 20.

Another advantage of the brooder 20 in comparison to the prior art is that the brooder 20 has an improved burner head 76 which does not warp due to the lack of welding holding the top and bottom plates 84, 86 together. Also, as the top and bottom plates 84, 86 are not formed of cast iron, it not as essential to keep the burner head 76 clean. Despite the fact that it may not be as important to keep the burner head 76 clean, the burner head 76 is easy to clean as the burner ports 118 are not small, individualized, and separated along the majority of their lengths, but rather are large and are only separated at the periphery of the burner head 76. Furthermore, the top and bottom plates 84, 86 can be more easily separated that prior are plates of a burner head, if desired, by bending the tabs 116 of the port spacers 112 back upwardly to a generally vertical position. The burner ports 118 being only separated at the periphery of the burner head 76 also provides the advantage of having more room within the burner head 76 for primary air and fuel to mix. The domed inner portion 94 of the top plate 84 further allows for volume of primary air and fuel for final mixing.

Furthermore, the design of the burner head 76 allow for both proper port spacing, as well as a stepped surface to properly align and locate the top and bottom plates 84, 86, thus affixing the final size of the burner ports 118. Thus, the design of the burner head 76 allows for a quick, accurate, automated assembly of the components of the burner head 76 during manufacturing. The formation of the plates 84, 86 themselves is also advantageous, both in terms of time and cost, as the plates 84, 86 can be formed by a stamping process.

The brooder 20 described and illustrated thus has a novel construction, both in its structure and in the method of forming same.

While a preferred embodiment of the present invention is shown and described, it is envisioned that those skilled in the art may devise various modifications of the present invention without departing from the spirit and scope of the invention. It is also to be understood that the various methods of invention that are described and claimed herein need not necessarily have the steps of same performed in the manner as described and claimed.

The invention is claimed as follows:

1. A brooder comprising:
    a canopy;
    a cylindrical emitter, said emitter comprising an elongated piece of material having first and second opposite ends, wherein the elongated piece of material has a slot provided therethrough proximate to the first end thereof, wherein the elongated piece of material has an emitter tab extending outwardly from the second end thereof, wherein the elongated piece of material has first and second apertures extending therethrough with the first aperture extending through the emitter tab and the second aperture being provided proximate to the slot, the emitter tab being configured to be inserted into and through the slot in a manner which causes the first and second apertures to be positioned in alignment with one another to form said emitter;
    a burner assembly; and
    a framework which operatively connects the canopy, the cylindrical emitter and the burner assembly in position relative to one another wherein the framework has a leg having at least one leg tab extending inwardly therefrom, wherein the at least one leg tab extends through the first and second apertures in order to hold the cylindrical emitter in position relative to the framework.

2. The brooder as defined in claim 1, wherein the canopy is operatively connected to a top portion of the framework, the burner assembly is operatively connected to a bottom portion of the framework, and the cylindrical emitter is operatively connected to a middle portion of the framework.

3. The brooder as defined in claim 1, wherein the cylindrical emitter is operatively connected to the framework in a loose manner, thereby allowing for the cylindrical emitter to increase in size as it is heated without comprising the structure of the brooder.

4. The brooder as defined in claim 1, wherein the burner assembly comprises top and bottom plates, the top plate having at least one aperture extending therethrough, the bottom plate having a plurality of spacers extending upwardly therefrom, wherein at least one of the plurality of spacers has a free end which abuts against the top plate in order to define a burner port between the top and bottom plates, and wherein at least one of the plurality of spacers has a tab which extends therefrom and which extends through the at least one aperture of the top plate, the tab being bent down toward the top plate in order to secure the top and bottom plates together.

5. The brooder as defined in claim 1, wherein the elongated piece of material of said emitter is generally rectangular in configuration, whereby when the first and second apertures are positioned in alignment with one another, the elongated piece of material is in the form of a cylinder.

6. The brooder as defined in claim 5, wherein the elongated piece of material of said emitter has three slots provided therethrough proximate to the first end thereof, and wherein the elongated piece of material has three emitter tabs extending outwardly from the second end thereof, wherein the first aperture extends through a middle one of the three emitter tabs, and wherein the second aperture is proximate proximate to a middle one of the three slots, the three emitter tabs being configured to be inserted into and through the three slots in a manner which causes the first and second apertures to be positioned in alignment with one another.

* * * * *